US009090797B2

(12) United States Patent
Tang et al.

(10) Patent No.: US 9,090,797 B2
(45) Date of Patent: Jul. 28, 2015

(54) METHOD OF MITIGATING ICE BUILD-UP ON A SUBSTRATE

(71) Applicant: PPG INDUSTRIES OHIO, INC., Cleveland, OH (US)

(72) Inventors: Guangliang Tang, Stevenson Ranch, CA (US); Scott Joseph Moravek, Cranberry Township, PA (US); Edward Francis Rakiewicz, Gibsonia, PA (US); Davina J Schwartzmiller, Allison Park, PA (US); Michael Zalich, Pittsburgh, PA (US); Bruce A Connelly, Gibsonia, PA (US); Todd Roper, Katy, TX (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/227,351

(22) Filed: Mar. 27, 2014

(65) Prior Publication Data

US 2014/0212584 A1 Jul. 31, 2014

Related U.S. Application Data

(63) Continuation-in-part of application No. 13/688,571, filed on Nov. 29, 2012, now Pat. No. 8,765,228.

(60) Provisional application No. 61/566,077, filed on Dec. 2, 2011.

(51) Int. Cl.
| | |
|---|---|
| *B64F 5/00* | (2006.01) |
| *C09D 175/04* | (2006.01) |
| *C08L 3/00* | (2006.01) |
| *C08L 3/04* | (2006.01) |
| *C09D 5/00* | (2006.01) |
| *C08G 77/26* | (2006.01) |
| *B64D 15/00* | (2006.01) |

(52) U.S. Cl.
CPC ............ *C09D 175/04* (2013.01); *B64F 5/0063* (2013.01); *C08L 3/00* (2013.01); *C08L 3/04* (2013.01); *C09D 5/00* (2013.01); *B64D 15/00* (2013.01); *C08G 77/26* (2013.01)

(58) Field of Classification Search
None
See application file for complete search history.

(56) References Cited

U.S. PATENT DOCUMENTS

| | | | |
|---|---|---|---|
| 5,045,599 A * | 9/1991 | Murase | 525/102 |
| 5,275,645 A | 1/1994 | Ternoir et al. | |
| 5,618,860 A | 4/1997 | Mowrer et al. | |
| 6,797,795 B2 | 9/2004 | Byrd | |
| 6,809,169 B2 | 10/2004 | Byrd et al. | |
| 7,799,434 B2 | 9/2010 | Webster et al. | |
| 7,820,770 B2 | 10/2010 | Schoeley et al. | |
| 7,910,683 B2 | 3/2011 | Byrd et al. | |
| 2003/0232941 A1 | 12/2003 | Byrd | |
| 2003/0235696 A1 | 12/2003 | Byrd | |
| 2008/0199723 A1 | 8/2008 | Cho et al. | |
| 2008/0213599 A1 | 9/2008 | Webster et al. | |
| 2008/0286473 A1 | 11/2008 | Smith et al. | |
| 2010/0280148 A1 | 11/2010 | Webster et al. | |
| 2010/0323190 A9 | 12/2010 | Webster et al. | |
| 2011/0082254 A1 | 4/2011 | Sepeur et al. | |

FOREIGN PATENT DOCUMENTS

| | | |
|---|---|---|
| EP | 1849843 A1 | 10/2007 |
| WO | 2006006402 A1 | 1/2006 |
| WO | 2012065828 A1 | 5/2012 |

OTHER PUBLICATIONS

A. Dotan, et al., The Relationship between Water Wetting and Ice Adhesion, Journal of Adhesion Science and Technology 23 (2009) pp. 1907-1915.
Fraunhofer IFAM, Dr. Volkmar Stenzel, Anti-icing: Surfaces, Technical Approaches and Status, ECC "Smart Coatings" 2010, Berlin, Nov. 10, 2010, pp. 1-24.
NuSil Silicone Technology, Burkitt et al., Silicone Coatings for Aircraft, Sep. 25, 2007, pp. 1-16.

* cited by examiner

*Primary Examiner* — Erma Cameron
(74) *Attorney, Agent, or Firm* — Krisanne Shideler

(57) ABSTRACT

The present invention is directed to a method of mitigating ice build-up on a substrate, comprising applying to the substrate curable film-forming compositions comprising isocyanate-functional curing agents, film-forming compositions with functional groups reactive with the isocyanates, acrylic polymers having polysiloxane side chains, and polysiloxanes.

12 Claims, No Drawings

METHOD OF MITIGATING ICE BUILD-UP ON A SUBSTRATE

CROSS-REFERENCE TO RELATED APPLICATIONS

This application is a continuation-in-part of U.S. patent application Ser. No. 13/688,571, filed on Nov. 29, 2012, and entitled "METHOD OF MITIGATING ICE BUILD-UP ON A SUBSTRATE", which in turn claims the benefit of U.S. Provisional Application Ser. No. 61/566,077, filed Dec. 2, 2011, both of which are incorporated herein by reference in their entireties.

FIELD OF THE INVENTION

The present invention relates to methods of mitigating ice build-up on substrates, particularly suitable for use on aircraft parts.

BACKGROUND OF THE INVENTION

Ice control is a significant and practical concern for many industries. For example, icing on aircraft contributed about 12% of the total accidents that occurred between 1990 and 2000, according to the AOPA Air Safety Foundation accident database.

Icing is most likely to occur when the outside temperature is between 0° C. to −20° C. Icing can cause the formation of ice on airfoils and other surfaces of the aircraft structure, including wings, stabilizers, rudder, ailerons, engine inlets, propellers, rotors, fuselage and the like. Ice on the aircraft surface can distort the flow of air over the wing, rapidly reducing the wing's lift and significantly increasing drag. Wind tunnel and flight tests have shown that frost, snow, and ice accumulations (on the leading edge or upper surface of the wing) no thicker or rougher than a piece of coarse sandpaper can reduce lift by 30 percent and increase drag up to 40 percent. Larger accretions can reduce lift even more and can increase drag by 80 percent or more.

Spraying aircraft on the ground with glycol-based fluids is expensive and detrimental to environment. For example, cleaning a Cessna 172 of ice or light snow might require 10-15 gallons of fluid for a total cost of up to $160; removing light frost on a clear day from a medium-sized business jet might cost $300, and removing freezing rain on a heavy wet snow from the same mid-sized jet may cost close to $10,000.

Chemicals such as derivatives of glycol ethers have also been used to de-ice aircrafts, as they effectively lower the freezing point. Recently, however, Canada has banned 2-methoxyethanol as a de-icing chemical because of environmental concerns.

Anti-icing and de-icing are the two basic approaches to prevent icing for aircraft. Anti-Icing is turned on before the flight enters icing conditions, while deicing is used after ice has built up. There are several types of de-ice and/or anti-ice systems for modern aircraft that are generally categorized as mechanical, chemical and thermal. Specific examples include pneumatic boots, multiple juxtaposed electro-expulsive elements, de-icing fluids, diverted bleed air or hot air from turbine stages, and electrically conducting resistance heating elements. Energy consumption for this equipment is large. For example, the wattage required for an anti-ice system in a typical high-performance single engine or light twin aircraft, using the resistance heaters, is approximately 21,000 watts.

Polyurethane coating is currently applied onto all aircraft exterior surfaces due to the high performance such as durability, weather resistance, chemical resistance, low temperature resistance, corrosion resistance and fluid resistance. However, the polyurethane chemical structure has high surface energy and strong adhesion to the ice due to the hydrogen bonding.

It would be desirable to provide a method of mitigating ice build-up on a substrate using a coating that can significantly reduce the ice adhesion and meet the aircraft coatings material specification requirement.

SUMMARY OF THE INVENTION

The present invention is directed to a method of mitigating ice build-up on a substrate, comprising applying to the substrate a curable film-forming composition. The curable film-forming composition comprises:
  (a) a curing agent comprising isocyanate functional groups;
  (b) a film-forming polymer comprising functional groups reactive with the isocyanate groups in (a);
  (c) an acrylic polymer comprising (i) pendant functional groups reactive with the isocyanate groups in (a) and (ii) polysiloxane side chains; and
  (d) a polysiloxane different from the film-forming polymer (b) and the acrylic polymer (c).

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

By "polymer" is meant a polymer including homopolymers and copolymers, and oligomers. By "composite material" is meant a combination of two or more different materials.

In the method of the present invention, ice build-up on a substrate is mitigated by applying to the surface of the substrate a curable film-forming composition. Suitable substrates in the method of the present invention include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GAL-VANNEAL, and combinations thereof. Combinations or composites of ferrous and non-ferrous metals can also be used. In certain embodiments of the present invention, the substrate comprises a composite material such as a plastic or a fiberglass composite. In a particular embodiment, the substrate is a fiberglass and/or carbon fiber composite in the form of a wind blade. The method is also suitable for mitigating ice build-up on substrates used in turbines and aircraft parts such as airfoils, wings, stabilizers, rudders, ailerons, engine inlets, propellers, rotors, fuselage and the like.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, topcoats, etc., applied by any method including, but not limited to, electrodeposition, spraying, dip coating, roll coating, curtain coating, and the like.

In the method of the present invention, a curable film-forming composition is applied to at least one surface of the substrate. A substrate may have one continuous surface, or two or more surfaces such as two opposing surfaces. Typically the surface that is coated is any that is expected to be exposed to conditions conducive to ice build-up.

In certain embodiments, the curable film-forming composition applied to the substrate in the method of the present invention comprises:

(a) a curing agent comprising multiple isocyanate functional groups;

(b) a film-forming polymer comprising multiple functional groups reactive with the isocyanate groups in (a);

(c) an acrylic polymer comprising (i) pendant functional groups reactive with the isocyanate groups in (a) and (ii) polysiloxane side chains; and (d) a polysiloxane different from the film-forming polymer (b) and the acrylic polymer (c).

The curing agent (a) used in the curable film-forming composition may be selected from one or more polyisocyanates such as diisocyanates and triisocyanates including biurets and isocyanurates. Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethylene diisocyanate. Biurets of any suitable diisocyanate including 1,4-tetramethylene diisocyanate and 1,6-hexamethylene diisocyanate may be used. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and $\alpha,\alpha,\alpha',\alpha'$-tetramethylmeta-xylylene diisocyanate.

Trifunctional isocyanates may also be used as the curing agent, for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, and DES-MODUR N 3300, which is the isocyanurate of hexamethylene diisocyanate, available from Bayer Corporation. Specifically used polyisocyanates are trimers of diisocyanates such as hexamethylene diisocyanate and isophorone diisocyanate.

The polyisocyanate may also be one of those disclosed above, chain extended with one or more polyamines and/or polyols using suitable materials and techniques known to those skilled in the art to form a polyurethane prepolymer having isocyanate functional groups. Particularly suitable polyisocyanates are described in United States Patent Application Publication Number 2013/0344253 A1, paragraphs [0012]-[0033], incorporated herein by reference.

The curing agent (a) is present in the film-forming compositions in an amount ranging from 10 to 90 percent by weight, such as 40 to 65 percent by weight, often 45 to 60 percent by weight, based on the total weight of resin solids in the composition.

The curable film-forming composition used in the method of the present invention further comprises at least one film-forming polymer (b) having multiple functional groups reactive with the isocyanate groups in (a). Such functional groups are typically hydroxyl and/or amine functional groups.

The film-forming polymer may comprise a hydroxyl functional addition polymer, polyester polymer, polyurethane polymer, and/or polyether polymer. Often an acrylic polymer and/or polyester polymer having multiple hydroxyl functional groups is used.

Suitable addition polymers include copolymers of one or more ethylenically unsaturated monomers such as alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer may include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Preferred glycidyl esters include those of the structure:

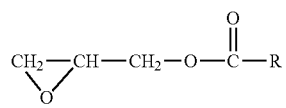

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

In certain embodiments of the present invention, the polymer used in the curable film-forming composition comprises a fluorinated polymer. Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minn. under the name FLUORAD; and perfluorinated hydroxyl functional (meth)acrylate resins.

A polyester polymer may be used in the curable film-forming composition. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Polyesters derived from cyclic esters such as caprolactone are also suitable.

Polyurethanes can also be used in the curable film-forming composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Examples of polyether polyols are polyalkylene ether polyols which include those having the following structural formula:

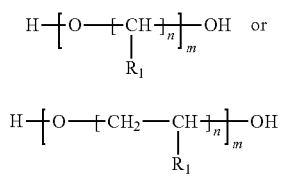

(i)

(ii)

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Useful amine functional film-forming polymers polyoxypropylene amines commercially available under the trademark designation JEFFAMINE®; amine functional acrylic polymers and polyester polymers prepared as known in the art are also suitable.

The film-forming polymer (b) is present in the film-forming compositions in an amount ranging from 10 to 90 percent by weight, such as 35 to 60 percent by weight, often 40 to 50 percent by weight, based on the total weight of resin solids in the composition.

In certain embodiments of the present invention, the curing agent (a) having isocyanate functional groups is used in relative excess to the film-forming polymer in the curable film-forming composition. For example, the equivalent ratio of isocyanate groups in the curing agent to functional groups in the film-forming polymer may be 1.1 to 2.0:1, often 1.1 to 1.7:1, or 1.5 to 1.7:1.

In particular embodiments of the present invention, multi-pack resin composition DESOTHANE CA 8905HP or DESOTHANE HS CA 8925/I1050, both available from PPG Aerospace, is used as the curing agent (a) and film-forming polymer (b) in the method of the present invention.

The curable film-forming composition used in the method of the present invention further comprises (c) an acrylic polymer comprising (i) pendant functional groups reactive with the isocyanate groups in (a) and (ii) polysiloxane side chains. Such polymers, known as silicone-modified acrylic polymers, typically have a plurality of polysiloxane side chains along the backbone of the polymer, as well as a plurality of pendant and/or terminal functional groups reactive with the isocyanate groups in (a). A representative hydroxyl functional structure (I) is shown below:

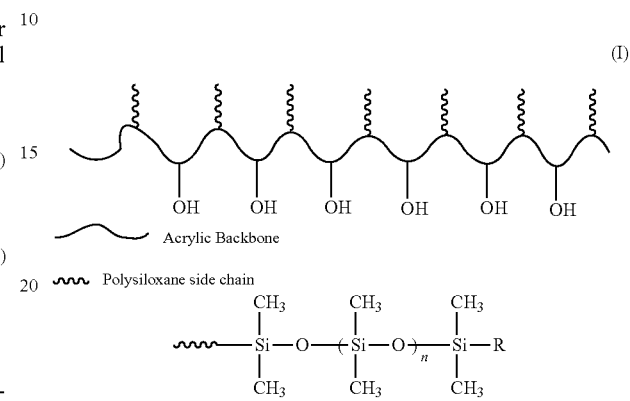

(I)

where n is selected such that the weight average molecular weight of each side chain is between 1000 and 30,000.

Hydroxyl functional acrylic polymers demonstrate hydroxyl values in the range of 5 to 100, often 10 to 80, and more often 20 to 60 mg KOH/g. Average weight molecular weight of the acrylic polymer (c) is in the range of 3,000 to 100,000, often 4,000~80,000 and more often 5,000~60,000. Suitable acrylic polymers (c) are disclosed in U.S. Pat. No. 7,122,599, column 2, line 35-column 7, line 40, incorporated herein by reference. A particularly suitable acrylic polymer is BYK-SILCLEAN 3700, available from BYK-Chemie.

Typical amounts of acrylic polymer (c) in the curable film-forming composition range from 1 to 40 percent by weight, such as 2 to 30 percent by weight, often 3 to 20 percent by weight, based on the total weight of resin solids in the curable film-forming composition.

The curable film-forming composition used in the method of the present invention further comprises (d) a polysiloxane. The polysiloxane is different from the film-forming polymer (b) and the acrylic polymer (c), and has weight average molecular weights of 200 to 100,000, such as 500 to 100,000, often 1,000 to 75,000 and more often 2,000 to 50,000. Suitable polysiloxanes include polymeric polysiloxanes such as polydimethylsiloxane (PDMS). The polysiloxane is either non-functional; i.e., it is not reactive with functional groups on other components in the curable film-forming composition, or the polysiloxane has at least one functional group that is reactive with functional groups on at least one other component in the curable film-forming composition. For example, the polysiloxane may have at least one hydroxyl and/or amine functional group, such as PDMS with at least two amine functional groups, allowing it to react with the curing agent having isocyanate functional groups. Examples of commercially available polysiloxanes include WACKER FLUID NH 130D, from WACKER Chemie AG; Shin-Etsu KF-6003, available from Shin-Etsu; MCR-C18, MCR-C62, and DMS-531, available from GELEST, Inc.; and DC 200-1000, available from Dow Corning. The polysiloxane (d) is present in the curable film-forming composition in an amount sufficient to mitigate ice build-up on the substrate when subjected to conditions conducive to ice formation; typical amounts of polysiloxane in the curable film-forming composition range from 1 to 40 percent by weight, such as 2 to 30 percent by weight, often 3 to 20 percent by weight, based on the total weight of resin solids in the curable film-forming composition.

It is noteworthy that the presence of the acrylic polymer (c) in the curable film-forming composition improves compatibility between the polysiloxane (d) and other components in the curable film-forming composition. When the acrylic polymer (c) is not present in the curable film-forming composition, the resultant coating is subject to surface defects such as fish eyes and craters, and appears oily.

The film-forming compositions of the present invention may further comprise a filler. Examples of fillers that can be present include finely divided minerals such as barium sulfate, silica, including fumed silica and colloidal silica, alumina, colloidal alumina, titanium dioxide, zirconia, colloidal zirconia, clay, mica, dolomite, talc, magnesium carbonate, calcium carbonate, calcium sulfate, calcium silicate, and/or calcium metasilicate. It is believed that the fillers, in combination with the resins in the composition, allow for useful rheological properties such as high viscosity at low shear. The combination of fillers and resins in the coating composition also allows for filling and/or bridging of surface defects on a substrate, making the substrate surface smoother than would be possible with other coating compositions. The ability of the first coating layer to smooth surface defects on the substrate substantially decreases or even eliminates the need for substrate surface preparation such as by sanding or the use of body putty, which can be time-consuming, labor-intensive, and expensive manufacturing steps. This advantage is particularly useful in the coating of large substrate parts or substrates with significant surface roughness, such as fiberglass substrates used in the manufacturing of wind blades. In certain embodiments of the present invention, at least 80 percent of surface defects of a substrate are corrected to an acceptable degree (i.e., requiring no additional surface preparation) upon application of the first coating layer.

The film-forming composition can additionally include a variety of optional ingredients and/or additives that are somewhat dependent on the particular application of the curable composition, such as other curing catalysts, pigments or other colorants, reinforcements, thixotropes, accelerators, surfactants, plasticizers, extenders, stabilizers, corrosion inhibitors, diluents, hindered amine light stabilizers, UV light absorbers, and antioxidants. The curable film-forming composition may be a color coat or clear coat; it may be opaque, translucent, tinted transparent, or colorless transparent.

The curable compositions used in the present invention can be prepared as a two-package composition, typically curable at ambient temperature. Two-package curable compositions are typically prepared by combining the ingredients immediately before use.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 1-25 mils (25.4-635 microns), often 5-25 mils (127-635 microns).

The film-forming compositions can be applied directly to the surface of the substrate or onto a primer coat or other coating, such as an electrocoat or topcoat, on the substrate. Suitable primers include HSP-7401, commercially available from PPG Industries, Inc., and commercially available aerospace compliant primers such as high solids epoxy primers. Alternatively, a primer may not be used and the film-forming compositions can be applied directly to a pigmented basecoat or other coating. A suitable aerospace pigmented coating is CA 8000, available from PPG Aerospace. Multiple coating layers such as a primer and a colored base coat may be applied to the substrate prior to application of the curable film-forming composition used in the method of the present invention.

After forming a film of the coating on the substrate, the composition can be cured by allowing it to stand at ambient temperature, or a combination of ambient temperature cure and baking, or by baking alone. The composition can be cured at ambient temperature typically in a period ranging from about 24 hours to about 36 hours. If ambient temperature and baking are utilized in combination, the composition is typically allowed to stand for a period of from about 5 hours to about 24 hours followed by baking at a temperature up to about 140° F. (60° C.), for a period of time ranging from about 20 minutes to about 1 hour.

After application of the curable film-forming composition to the substrate and upon curing, the coated substrate demonstrates a maximum average load force of 200 N or 100 N, when subjected to ICE ADHESION TEST described below.

Additionally, after 1600 hours of accelerated weathering as described below, the coated substrate demonstrates a maximum average load force of 400 N when subjected to ICE ADHESION TEST.

It is noteworthy that a second layer of the curable film-forming composition may be applied on top of the original layer of the curable film-forming composition, either immediately after cure of the original layer or later, without loss of properties and without the need for treatment of the original layer surface such as by sanding, partial or complete removal of the original curable film-forming composition, or application of an adhesion promoter.

The following examples are intended to illustrate various embodiments of the invention, and should not be construed as limiting the invention in any way.

EXAMPLES

To evaluate the effectiveness of formulation changes on ice adhesion an ICE ADHESION TEST was developed. The test method used was described in US Army Corps of Engineers Engineer Research and Development Center document number ERDC/CRREL TR-06-11, which is incorporated herein by reference. The fixture design as described therein was modified to interface with existing testing equipment and to receive test panels of approximately 0.032" thick. Generally, the procedure was as follows: A 4" wide test panel was coated on both sides with the desired coating(s). After the appropriate cure time, five 1×4" strips were cut from the test panel. The test strips were taped in place in the center of the test fixture such that the fixture could be filled with water one inch deep. Chilled water was used to fill the test fixtures ensuring that both sides of the coated panel are in contact with one inch of water. The entire test fixture was placed in a −20° C. freezer overnight. Then the test fixture was transferred to a tensile tester (e.g. INSTRON 5567) equipped with an environmental chamber also set to −20° C. The test fixture was mounted such that the fixed end of the tensile tester is connected to the test fixture and the movable jaw is connected to the test panel. This testing setup creates a relative motion between the test strip and the ice that was formed from the water. The tape that held the test strip and water in place was removed and then, using a constant extension rate, the maximum force required to remove the panel from the ice was recorded. Typically, five specimens of each coating variation were tested and an average maximum load reported.

Accelerated weathering testing was conducted as follows: The coating to be tested was applied to both sides of an aluminum panel that was first coated with a primer or a basecoat. The coating was allowed to fully cure, such as curing at room temperature for 14 days before performing the test. The coated panels were subjected to standard QUV-B exposure, alternating 8 hours of ultraviolet irradiation at 60° C. and 4 hours at 45° C. and 100 percent relative humidity without ultraviolet irradiation. Irradiance is set at set at 0.68 w/m$^2$. After 1600 hours exposure on one side of the panel, the panels were flipped to expose the other side for 1600 hours. Therefore, both sides of the coated panel were exposed for 1600 hours of QUV-B light.

Examples

The following materials were used to prepare both control compositions and experimental compositions:

DESOTHANE CA 8905HP is a two-component ambient cure polyurethane clearcoat supplied by PPG Aerospace. CA8905HP base component is a mixture of polyol resins solution with solid content of 33.7% by weight, CA8905B activator component is a mixture of aliphatic polyisocyanates with solid content of 100% by weight.

DESOTHANE HS CA8925/I1050 is a three-component ambient cure white polyurethane topcoat supplied by PPG Aerospace. CA8925 base component is a mixture of polyol resins and a blend of pigments and fillers with solid content of 71.0% by weight, CA8925B activator component is a mixture of aliphatic polyisocyanates with solid content of 100%, the thinner component CA8925C thinner component is a mixture of solvents with 0% solid content.

DESOPRIMER CA 7700 is a corrosion resistant epoxy primer supplied by PPG Aerospace. One part of CA7700A was mixed with one part of CA7700BE and applied to scotch-brite abraded aluminum surface for a dry film thickness of 1 mil (25 microns).

DESOTHANE® CA 8000 is a two-component ambient cure polyurethane base coat supplied by PPG Aerospace. Two parts of CA8000 base component is mixed with one part of CA8000B activator, and one part of thinner.

BYK-SILCLEAN 3700 is 25% solid content resin clear solution in 1-methoxy-2-propanol acetate with hydroxyl value of 30 mgKOH/g based on the solid resin and average weight molecular weight of 15,000, supplied by BYK-Chemie.

WACKER NH130D is a 100% solid content aminopropyl terminated polydimethylsiloxane with molecular weight of 12,500, supplied by WACKER.

SHIN-ETSU KF-6003 is a 100% solid content biscarbinol terminated polydimethylsiloxane with molecular weight of 5,000, supplied by Shin-Etsu.

GELEST MCR-C18 is a 100% solid content monocarbinol terminated polydimethylsiloxane with molecular weight of 5,000, supplied by GELEST Inc.

GELEST MCR-C62 is a 100% solid content monodicarbinol terminated polydimethylsiloxane with molecular weight of 5,000, supplied by GELEST Inc.

GELEST DSM-S31 is a 100% solid content silanol terminated polydimethylsiloxane with molecular weight of 26,000, supplied by GELEST Inc.

DC200-1000 is a 100% solid content polydimethylsiloxane silicone fluid with viscosity of 1000 cSt, supplied by Dow Corning.

Substrate Preparation
Primer Substrate Preparation:

Aluminum panel was wiped with solvents such as ketones to remove the grease, abraded with scotch-brite and cleaned again with solvents. An aerospace qualified primer was applied to the cleaned surface to dry film thickness of 1.0 mil (25 micrometer). For ice adhesion test, both sides of the aluminum panel were cleaned, scotch-brite abraded, cleaned and coated with primer.

Basecoat Substrate Preparation:

After 2~5 hours ambient cure of the primer, a CA8000 basecoat was applied onto the primer to obtain a dry film thickness of around 2 mils (50 microns). For ice adhesion test, both sides of the aluminum panel were cleaned, SCOTCH-BRITE abraded, cleaned and coated with primer.

Polyurethane Ice Release Coating Preparation
Polyurethane Ice Release Clearcoat

DESOTHANE® CA8905HP was selected as the coating matrix to prepare the ice release clearcoat. A silicone fluid was mixed with a silicone modified acrylic polyol with low shear mixing and slowly added to CA8905HP base component under mixing. CA8905B activator was added to the above mixture and mixed. The ice release clearcoat was applied to the Basecoat Substrate as described above (Basecoat Substrate Preparation) with drawdown bar to obtain a dry film thickness of around 2 mils (50 microns).

Let the coating system fully cure, by curing at room temperature for 7~14 days before performing the test. For ice adhesion test, the coating was applied to both sides of the basecoat substrate.

Polyurethane Ice Release Topcoat

DESOTHANE® CA8925 was selected as the topcoat. A silicone fluid was mixed with a silicone modified acrylic polyol with low shear mixing and slowly added to CA8925 base component under mixing. CA8925B activator and CA8925C thinner were added to the above mixture and mixed. The ice release topcoat was applied to the Primer Substrate as described above (Primer Substrate Preparation) with drawdown bar to obtain a dry film thickness of around 2 mils (50 microns).

Let the coating system fully cure, by curing at room temperature for 7~14 days before performing the test. For ice adhesion test, the coating was applied to both sides of the primer substrate.

Examples of the Control Experiments

Control 1: Polyurethane Clearcoat 34.39 parts of CA8905B activator was mixed with 100 parts of CA 8905HP base component. Coating was applied to Basecoat Substrate for a dry film thickness of 2 mils (50 microns).

Control 2: Polyurethane Clearcoat with Amine Terminated PDMS Silicone Fluid 4.72 parts of WACKER NH130D was mixed with 100 parts of CA 8905HP base component with high shear mixing. Then 34.39 parts of CA 8905B activator was mixed with the above mixture. Coating was applied to Basecoat Substrate for a dry film thickness of 2 mils (50 microns).

Control 3: Polyurethane Clearcoat with Carbinol Terminated PDMS Silicone Fluid 4.72 parts of SHIN-ETSU KF-6003 was mixed with 100 parts of CA 8905HP base component with high shear mixing. Then 34.39 parts of CA 8905B activator was mixed with the above mixture. Coating was applied to Basecoat Substrate for a dry film thickness of 2 mils (50 microns).

Control 4: Polyurethane Clearcoat with Monocarbinol Terminated PDMS Silicone Fluid 4.72 parts of GELEST MCR-C18 was mixed with 100 parts of CA 8905HP base component with high shear mixing. Then 34.39 parts of CA 8905B activator was mixed with the above mixture. Coating was applied to Basecoat Substrate for a dry film thickness of 2 mils (50 microns).

Control 5: Polyurethane Clearcoat with Monodicarbinol Terminated PDMS Silicone Fluid 4.72 parts of GELEST MCR-C62 was mixed with 100 parts of CA 8905HP base component with high shear mixing. Then 34.39 parts of CA 8905B activator was mixed with the above mixture. Coating was applied to Basecoat Substrate for a dry film thickness of 2 mils (50 microns).

Control 6: Polyurethane Clearcoat with Silanol Terminated PDMS Silicone Fluid 4.72 parts of GELEST DMS-S31 was mixed with 100 parts of CA 8905HP base component with high shear mixing. Then 34.39 parts of CA 8905B activator was mixed with the above mixture. Coating was applied to Basecoat Substrate for a dry film thickness of 2 mils (50 microns).

Control 7: Polyurethane Clearcoat with PDMS Silicone Fluid 4.72 parts of DC200-1000 was mixed with 100 parts of CA 8905HP base component with high shear mixing. Then 34.39 parts of CA 8905B activator was mixed with the above mixture. Coating was applied to Basecoat Substrate for a dry film thickness of 2 mils (50 microns).

Control 8: Polyurethane Clearcoat with Silicone-Modified Acrylic Polyol, BYK-SILCLEAN 3700

16.23 parts of BYK-SILCLEAN 3700 was mixed with 100 parts of CA 8905HP base component with high shear mixing. Then 34.39 parts of CA 8905B activator was mixed with the above mixture. Coating was applied to Basecoat Substrate for a dry film thickness of 2 mils (50 microns).

Control 9: Polyurethane Topcoat 40.0 parts of CA8925B activator and 29.2 parts of CA8925C thinner were added to 100 parts of CA 8925/I1050 base component and mixed. Coating was applied to Primer Substrate for a dry film thickness of 2 mils (50 microns).

Control 10: Polyurethane White Topcoat with Silicone Modified Acrylic Polyol 32.2 parts of BYK SILCLEAN 3700 was added to 100 parts of CA 8925/I1050 base component and mixed with low shear mixing blade. Then 40.0 parts of CA8925B activator and 29.2 parts of CA8925C thinner were added and mixed. Coating was applied to Primer Substrate for a dry film thickness of 2 mils (50 microns).

Control 11: Polyurethane White Topcoat with Silicone Modified Acrylic Polyol 64.4 parts of BYK SILCLEAN 3700 was added to 100 parts of CA 8925/I1050 base component and mixed with low shear mixing blade. Then 40.0 parts of CA8925B activator and 29.2 parts of CA8925C thinner were added and mixed. Coating was applied to Primer Substrate for a dry film thickness of 2 mils (50 microns).

Examples of Inventive Ice Release Polyurethane Coating

Example 1

Polyurethane Ice Release Clearcoat with a Silicone Modified Acrylic Polyol Resin and an Amine Terminated PDMS, WACKER NH130D 4.72 parts of WACKER NH130D was mixed with 16.23 parts of silicone modified acrylic polyol with low shear mixing and slowly added to 100 parts of CA8905HP base component under mixing. 34.39 parts of CA8905B activator was added to the above mixture and mixed. The ice release clearcoat was applied to the Basecoat Substrate as described above (Basecoat Substrate Preparation) with drawdown bar to obtain a dry film thickness of around 2 mils (50 microns).

Example 2

Polyurethane Ice Release Clearcoat with a Silicone Modified Acrylic Polyol Resin and a Biscarbinol Terminated PDMS, Shin-Etsu KF-6003

4.72 parts of SHIN-ETSU KF-6003 was mixed with 16.23 parts of silicone modified acrylic polyol with low shear mixing and slowly added to 100 parts of CA8905HP base component under mixing. 34.39 parts of CA8905B activator was added to the above mixture and mixed. The ice release clearcoat was applied to the Basecoat Substrate as described above (Basecoat Substrate Preparation) with drawdown bar to obtain a dry film thickness of around 2 mils (50 microns).

Example 3

Polyurethane Ice Release Clearcoat with a Silicone Modified Acrylic Polyol Resin and a Monocarbinol Terminated PDMS, GELEST MCR-C18

4.72 parts of GELEST MCR-C18 was mixed with 16.23 parts of silicone modified acrylic polyol with low shear mixing and slowly added to 100 parts of CA8905HP base component under mixing. 34.39 parts of CA8905B activator was added to the above mixture and mixed. The ice release clearcoat was applied to the Basecoat Substrate as described above (Basecoat Substrate Preparation) with drawdown bar to obtain a dry film thickness of around 2 mils (50 microns).

Example 4

Polyurethane Ice Release Clearcoat with a Silicone Modified Acrylic Polyol Resin and a Monodicarbinol Terminated PDMS, GELEST MCR-C62

4.72 parts of GELEST MCR-C62 was mixed with 16.23 parts of silicone modified acrylic polyol with low shear mixing and slowly added to 100 parts of CA8905HP base component under mixing. 34.39 parts of CA8905B activator was added to the above mixture and mixed. The ice release clearcoat was applied to the Basecoat Substrate as described above (Basecoat Substrate Preparation) with drawdown bar to obtain a dry film thickness of around 2 mils (50 microns).

Example 5

Polyurethane Ice Release Clearcoat with a Silicone Modified Acrylic Polyol Resin and a Silanol Terminated PDMS, GELEST DMS-S31

4.72 parts of GELEST DMS-S31 was mixed with 16.23 parts of silicone modified acrylic polyol with low shear mixing and slowly added to 100 parts of CA8905HP base component under mixing. 34.39 parts of CA8905B activator was added to the above mixture and mixed. The ice release clearcoat was applied to the Basecoat Substrate as described above (Basecoat Substrate Preparation) with drawdown bar to obtain a dry film thickness of around 2 mils (50 microns).

Example 6

Polyurethane Ice Release Clearcoat with a Silicone Modified Acrylic Polyol Resin and a Methyl Terminated PDMS, Dow Corning 200 Fluid 1000CST 4.72 parts of DOW CORNING 200 Fluid 1000CST was mixed with 16.23 parts of silicone modified acrylic polyol with low shear mixing and slowly added to 100 parts of CA8905HP base component under mixing. 34.39 parts of CA8905B activator was added to the above mixture and mixed. The ice release clearcoat was applied to the Basecoat Substrate as described above (Basecoat Substrate Preparation) with drawdown bar to obtain a dry film thickness of around 2 mils (50 microns).

Example 7

Polyurethane Ice Release Topcoat with a Silicone Modified Acrylic Polyol Resin and an Amine Terminated PDMS, WACKER NH130D 8.07 parts of WACKER NH130D was mixed with 26.44 parts of silicone modified acrylic polyol with low shear mixing and slowly added to 100 parts of CA8925/I1050 base component under mixing. 40.00 parts of CA8905B activator and 29.20 parts of CA8925C thinner were added to the above mixture and mixed. The ice release topcoat was applied to the Primer Substrate as described above (Primer Substrate Preparation) with drawdown bar to obtain a dry film thickness of around 2 mils (50 microns).

Example 8

Polyurethane Ice Release Topcoat with Silicone Modified Acrylic Polyol Resin and Amine Terminated PDMS, WACKER NH130D 16.14 parts of WACKER NH130D was mixed with 26.44 parts of silicone modified acrylic polyol with low shear mixing and slowly added to 100 parts of CA8925/I1050 base component under mixing. 40.00 parts of CA8905B activator and 29.20 parts of CA8925C thinner were added to the above mixture and mixed. The ice release topcoat was applied to the Primer Substrate as described above (Primer Substrate Preparation) with drawdown bar to obtain a dry film thickness of around 2 mils (50 microns).

Additional Testing Methods

Coatings properties of the fully cured sample were tested with following described procedures.

Gloss

Gloss was determined according to ASTM D523 using a BYK-Gardner Haze-Gloss meter.

SKYDROL Resistance

The coating applied to test panels was immersed in the hydraulic fluid, such as SKYDROL LD-4 (from Solutia Inc.) at the temperature of 140° F. for 24 hours. Pencil hardness of the coatings film was determined in accordance with ASTM D3363.

Crosshatch Adhesion

Crosshatch adhesion was determined in accordance with ASTM D3359, method B. A crosshatch pattern was scribed through the coating down to the substrate. A strip of 1 inch wide masking tape such as 3M 250 or equivalent was applied. The tape was pressed down using two passes of a 4.5-pound rubber covered roller. The tape was removed in one abrupt motion perpendicular to the panel. The adhesion was rated by a visual examination of the paint at the crosshatch area using the provided rating system. Dry adhesion was tested after fully curing of the coating system. Wet adhesion was tested with fully cured coating system after immersing in 140° F. water for 24 hours. Panel was pulled out from the water, wiped to dry with paper towel and checked adhesion in 5 minutes.

Pencil Hardness

Pencil hardness was determined in accordance with ASTM D3363. Hardness was determined relative to a standard set of pencil leads by scratching the leads across the coating film at a 45 degree angle and for about ¼ inch stroke. The process was repeated until a lead was identified that did not scratch the film. The number of the lead was recorded as the hardness.

Low Temperature Flexibility with Cylindrical Mandrel Tester

It was determined in accordance with ASTM D522, Method B. Coated panels and the Mandrel Tester were subjected to a temperature of −65 degree F. (−54 degree C.) for 2 hours. While at this temperature, place the test panel over a mandrel with the uncoated side in contact and with a least 2 inches overhang on either side. Using a steady pressure of the fingers, bend the panel approximately 180 degree around the mandrel at a uniform velocity. Removed and examined the panel immediately for any cracking, or loss of adhesion.

TABLE 1

Properties of the Coatings

| | Notes | Appearance | 20° Gloss | 60° Gloss |
|---|---|---|---|---|
| Control 1 | Clearcoat itself | High gloss | 86.0 | 94.1 |
| Control 2 | Clearcoat with WACKER NH130D | Greasy surface | | |
| Control 3 | Clearcoat with SHIN-ETSU KF-6003 | Greasy surface | | |
| Control 4 | Clearcoat with GELEST MCR-C18 | Greasy surface | | |
| Control 5 | Clearcoat with GELEST MCR-C62 | Greasy surface | | |
| Control 6 | Clearcoat with GELEST DMS-S31 | Greasy surface | | |
| Control 7 | Clearcoat with DOW CORNING 200 fluid 1000 CST | Greasy surface | | |
| Control 8 | Clearcoat with BYK SILCLEAN 3700 | High gloss | 86.2 | 93.7 |

TABLE 1-continued

Properties of the Coatings

| Example | Description | Gloss | | |
|---|---|---|---|---|
| Example 1 | Clearcoat with SILCLEAN 3700 and WACKER NH130D | High gloss | 84.8 | 94.4 |
| Example 2 | Clearcoat with SILCLEAN 3700 and SHIN-ETSU KF-6003 | High gloss | 84.8 | 93.60 |
| Example 3 | Clearcoat with SILCLEAN 3700 and GELEST MCR-C18 | High gloss | 85.6 | 94.00 |
| Example 4 | Clearcoat with SILCLEAN 3700 and GELEST MCR-C62 | High gloss | 88.3 | 94.00 |
| Example 5 | Clearcoat with SILCLEAN 3700 and GELEST DMS-S31 | High gloss | 87.2 | 94.20 |
| Example 6 | Clearcoat with SILCLEAN 3700 and DC200 fluid 1000 CST | High gloss | 86.3 | 93.50 |
| Control 9 | Topcoat itself | High gloss | 82.4 | 93.1 |
| Control 10 | Topcoat with SILCLEAN 3700 | High gloss | 85.5 | 93.2 |
| Control 11 | Topcoat with SILCEAN 3700 | High gloss | 85.3 | 93.4 |
| Example 7 | Topcoat with SILCLEAN 3700 and WACKER NH130D | High gloss | 82.5 | 93.9 |
| Example 8 | Topcoat with SILCLEAN 3700 and WACKER NH130D | High gloss | 80.4 | 92.3 |

| Example | Water contact angle (°) | Ice Adhesion Max Load (N) | Ice Adhesion Max Load % of Control | Ice Adhesion Reduction of the Control | Standard Deviation | Pencil Hardness after SKYDROL |
|---|---|---|---|---|---|---|
| Control 1 | 80.6 | 1345 | 100.0% | 0.0% | 285 | 3H |
| Control 8 | 102.9 | 513 | 38.1% | 61.9% | 132 | 3H |
| Example 1 | 104.8 | 181 | 13.5% | 86.5% | 71 | HB |
| Example 2 | 102.3 | 187 | 13.9% | 86.1% | 10 | F |
| Example 3 | 103.6 | 99 | 7.4% | 92.6% | 56 | F |
| Example 4 | 105.7 | 101 | 7.5% | 92.5% | 48 | F |
| Example 5 | 101.9 | 181 | 13.5% | 86.5% | 63 | HB |
| Example 6 | 101.8 | 177 | 13.2% | 86.8% | 58 | HB |
| Control 9 | 84.6 | 1032 | 100.0% | 0.0% | 174 | 3H |
| Control 10 | 99.4 | 626 | 60.7% | 39.3% | 86 | 3H |
| Example 7 | 104.5 | 36 | 3.5% | 96.5% | 10 | HB |
| Example 8 | 105.5 | 44 | 4.3% | 95.7% | 23 | 2B |

Summary of Results

1. Significant Ice Adhesion Reduction (8595% Reduction) Polyurethane Ice Release Clearcoat (Control 1/8 versus Example 3)

Polyurethane clearcoat with 5.62% of silicone modified acrylic polyol exhibited 61.9% ice adhesion reduction.

Addition of a combination of a silicone modified acrylic polyol with silicone fluid GELEST MCR-C18 (hydroxyethoxypropyl terminated polydimethylsiloxane with molecular weight of 5,000) exhibited 92.6% ice adhesion reduction. Polyurethane Ice Release Topcoat (Control 9/10 Versus Example 7)

Polyurethane topcoat with 6.76% of silicone modified acrylic polyol exhibited 39.3% ice adhesion reduction.

Addition of a combination of a silicone modified acrylic polyol with silicone fluid Wacker NH130D (aminopropyl terminated polydimethylsiloxane with molecular weight of 12,500) exhibited 96.5% ice adhesion reduction.

2. High Gloss (20° Gloss: >80)

Silicone fluid has poor compatibility with polyurethane coating and exhibited oily and greasy surface. Addition of a silicone modified acrylic polyol resin improved the compatibility of the polyurethane coating and resulted in high gloss coating surface.

3. Highly Hydrophobic Coating (Water Contact Angle: >100)

Surface of the polyurethane coating with the addition of a combination of the silicone fluid and the silicone modified acrylic polyol resin turned to highly hydrophobic and consistently displayed water contact angle of over 100 degree.

TABLE 2

Ice Adhesion Results after Weathering Resistance Test

| Experiment | Ice Adhesion Max Load (N) | Ice Adhesion Max Load % of Control | Ice Adhesion Reduction of the Control | Standard Deviation |
|---|---|---|---|---|
| Control 11 | 515 | 49.8% | 50.2% | 98 |
| Control 11 after QUV-B Exposure | 1050 | 101.7% | −1.7% | 312 |
| Example 7 | 36 | 3.5% | 96.5% | 10 |
| Example 7 After QUV-B Exposure | 333 | 32.2% | 67.8% | 98 |

The inventive example (7) that contains both the PDMS modified acrylic polyol and silicone fluid displayed excellent ice adhesion reduction (ice release) after 1600 hours of UV-B light exposure. While the same polyurethane coating modified with PDMS modified acrylic polyol (Control 11) only exhibited poor ice adhesion reduction.

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. A method of mitigating ice build-up on a substrate, comprising applying to at least a portion of the substrate a curable film-forming composition comprising:
   (a) a curing agent comprising isocyanate functional groups;
   (b) a film-forming polymer comprising functional groups reactive with the isocyanate groups in (a);
   (c) an acrylic polymer comprising (i) pendant functional groups reactive with the isocyanate groups in (a) and (ii) polysiloxane side chains; and
   (d) a polysiloxane different from the film-forming polymer (b) and the acrylic polymer (c), wherein upon application of the curable film-forming composition to the substrate and upon curing, the coated substrate demonstrates an initial maximum average load force of 200 N when subjected to ICE ADHESION TEST, and wherein after 1600 hours of accelerated weathering, the coated substrate demonstrates a maximum average load force of 400 N when subjected to ICE ADHESION TEST.

2. The method of claim 1, wherein the curing agent (a) comprises a polyurethane prepolymer having isocyanate functional groups.

3. The method of claim 1, wherein the film-forming polymer (b) comprises an acrylic polymer, a polyether polymer, and/or a polyester polymer.

4. The method of claim 1 wherein the acrylic polymer (c) is present in the curable film-forming composition in an amount of 1 to 40 percent by weight, based on the total weight of resin solids in the curable film-forming composition.

5. The method of claim 1, wherein the curable film-forming composition can cure at ambient temperature.

6. The method of claim 1, wherein the substrate comprises metal, plastic, a fiberglass composite and/or carbon fiber composite.

7. The method of claim 1, wherein a primer and/or pigmented basecoat film-forming composition is applied to at least a portion of the substrate prior to the application of the curable film-forming composition, and the curable film-forming composition is subsequently applied to at least a portion of the primer and/or basecoat.

8. The method of claim 1 wherein the polysiloxane (d) comprises at least one functional group that is reactive with functional groups on at least one other component in the curable film-forming composition.

9. The method of claim 1 wherein the polysiloxane (d) is not reactive with functional groups on other components in the curable film-forming composition.

10. The method of claim 1 wherein the polysiloxane (d) has a weight average molecular weight of 200 to 100,000.

11. The method of claim 1 wherein the polysiloxane (d) is present in the curable film-forming composition in an amount of 1 to 40 percent by weight, based on the total weight of resin solids in the curable film-forming composition.

12. The method of claim 11 wherein the polysiloxane (d) is present in the curable film-forming composition in an amount of 2 to 30 percent by weight, based on the total weight of resin solids in the curable film-forming composition.

* * * * *